(12) United States Patent
Barajas Gonzalez et al.

(10) Patent No.: US 10,896,207 B2
(45) Date of Patent: Jan. 19, 2021

(54) OPTIMIZATION OF OBJECT-BASED STORAGE

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Tram Nguyen, San Jose, CA (US); Richard A. Welp, Manchester (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 878 days.

(21) Appl. No.: 14/831,198

(22) Filed: Aug. 20, 2015

(65) Prior Publication Data

US 2017/0053018 A1 Feb. 23, 2017

(51) Int. Cl.
*G06F 16/28* (2019.01)
*G06F 16/955* (2019.01)

(52) U.S. Cl.
CPC .......... *G06F 16/289* (2019.01); *G06F 16/285* (2019.01); *G06F 16/955* (2019.01)

(58) Field of Classification Search
CPC ......... G06F 17/30607; G06F 17/30598; G06F 17/30876
See application file for complete search history.

(56) References Cited

U.S. PATENT DOCUMENTS

| | | | |
|---|---|---|---|
| 6,128,717 A | 10/2000 | Harrison et al. | |
| 7,831,567 B2* | 11/2010 | Luther | G06F 17/30368 707/663 |
| 8,150,803 B2* | 4/2012 | Hoang | G06F 17/30014 707/616 |
| 8,239,427 B2 | 8/2012 | Lin | |
| 8,285,681 B2 | 10/2012 | Prahlad et al. | |
| 8,825,602 B1 | 9/2014 | Desai et al. | |
| 9,002,795 B2 | 4/2015 | Messinger et al. | |
| 9,298,726 B1* | 3/2016 | Mondal | G06F 17/30159 |
| 2005/0033777 A1 | 2/2005 | Moraes et al. | |
| 2011/0055254 A1* | 3/2011 | Symons | G06Q 30/02 707/769 |
| 2011/0145497 A1* | 6/2011 | Bish | H04L 67/1095 711/113 |
| 2012/0159421 A1* | 6/2012 | Driesen | G06F 11/0718 717/101 |
| 2013/0031455 A1* | 1/2013 | Griffiths | G06F 17/2247 715/230 |

(Continued)

OTHER PUBLICATIONS

Mesnier et al., "Object-based storage", pp. 84-90, Communications Magazine, IEEE 41.8 (2003).

*Primary Examiner* — Ashish Thomas
*Assistant Examiner* — Dustin D Eyers
(74) *Attorney, Agent, or Firm* — Griffiths & Seaton PLLC

(57) ABSTRACT

Various embodiments for management of object-based storage by a processor. A relationship-based analysis of attributes of an object in the storage is performed. A repository of the attributes is maintained, and a modification to the object insofar as any of the attributes change, is tracked. An object-based storage architecture is organized for the object using the attributes and their relationships.

15 Claims, 6 Drawing Sheets

(56) References Cited

U.S. PATENT DOCUMENTS

2014/0122294 A1* 5/2014 Chen ................. G06Q 30/0609
                                                705/26.35
2015/0052445 A1* 2/2015 Villamor ............... G06F 3/0484
                                                715/739

* cited by examiner

OPTIMIZATION OF OBJECT-BASED STORAGE

BACKGROUND OF THE INVENTION

Field of the Invention

The present invention relates in general computing systems, and more particularly to, various embodiments for optimizing object-based storage environments.

Description of the Related Art

In today's society, computer systems are commonplace. Computer systems may be found in the workplace, at home, or at school. Computer systems may include data storage systems, or disk storage systems, to process, store, and archive data. Large data archiving solutions typically use tape library systems where workstations and client devices are connected to one or more servers, and the servers are connected to one or more libraries. In data centers, such as those providing imaging for health care, entertainment, weather, military, and space exploration applications, these servers and libraries are often interconnected in a grid-computing environment.

SUMMARY OF THE INVENTION

Various embodiments for management of object-based storage by a processor are provided. In one embodiment, by way of example only, a method for management of object-based storage by a processor is provided. A relationship-based analysis of attributes of an object in the storage is performed. A repository of the attributes is maintained, and a modification to the object insofar as any of the attributes change, is tracked. An object-based storage architecture is organized for the object using the attributes and their relationships

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
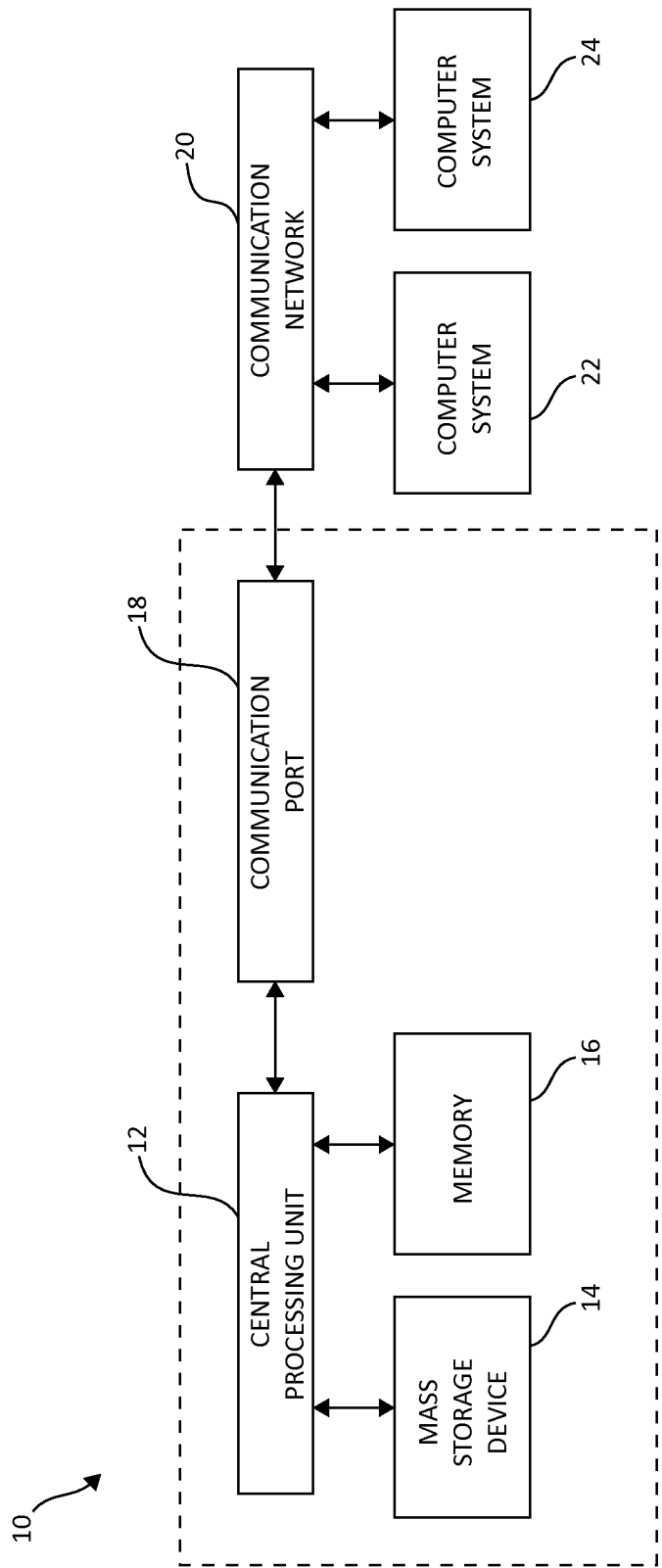
FIG. 1 is an exemplary block diagram showing a hardware structure for performing object-based storage enhancement functionality, in which aspects of the present invention may be realized.

With traditional object-based storage, there exists the common approach to storing data where as data is stored at the same level in a flat disk space with no hierarchies and with no object nesting. These kind of storage systems have been found to be highly scalable and are designed for write-one-read-many file access models.

Within these models every object has its own metadata and gets assigned a unique identifier, which allows the owner of the object to retrieve an object without knowing where the object is actually located. Object-based storage model brings many advantages, but also limits the operations the storage system can perform. These limitations may lead to resource under-utilization. For example, if a system is not actually reading or doing anything with the data at all, this system is not being utilized to its full potential. In addition, the data being written as objects, can only be read as objects. This brings into play issues when attempts are made to apply block based data optimization methods such data deduplication. Object based storage is undeniably a key piece to the future of large, scaled-out storage environments, but with it, a new approach is needed to approach data than what has been in the past.

To address the potential drawbacks of current object-based storage implementations, the illustrated embodiments, following, describe various mechanisms for maintaining a number of relationships between objects within an object-based storage environment. Inclusive of these mechanisms are systems, computer program products, hardware, and other components that assist in enhancing the object-based storage environment as will be further described.

Object-based storage, as previously mentioned, is a storage methodology that is rapidly gaining popularity due to its versatility, flexibility and high scalability. Within object based storage, data stored has the possibility of being stored as just generic data or data with specific relationships between themselves. Examples include a parent/child, flat, and consistency based relationship characteristics.

These relationships allow for data to take on a hierarchy that can then be utilized for the very flexibility, versatility, and scalability previously mentioned. The mechanisms of the illustrated embodiments track and maintain those relationships, so that the user, administrator, or other personnel can then implement key features otherwise not currently found within object-based storage. These features include but are not limited to, data deduplication, grouping notifications, and clustering of objects.

In one embodiment, a "repository" (or a number of repositories) as will be further described, may be initialized to organize, maintain, and track (in real-time, for example) any/all object IDs associated with a particular object. In addition, upon the creation of this repository, various characteristics (e.g., "attributes") and relationships between the various objects may also be created, populated, established, organized, and tracked over time in the repository or repositories linked to a particular object.

In another embodiment, object characteristic referencing functionality may be implemented, such that when a user moves to modify an object, the repositories above (and tables within) will be referenced so as to note any and all relationships that that object is shared with. These references allow for the mechanisms of the illustrated embodiments to then act accordingly with the will of the user while still maintaining features that mechanisms of the illustrated embodiments have enabled.

In still another embodiment, group locality functionality may be implemented. By defining a cluster of objects and enabling a locality flag, the mechanisms of the illustrated embodiments may ascertain that data can only exist within certain clusters and storage areas. If, for example, a user attempts to move objects to storage that is not defined as within the appropriate locality, a warning can be presented to the user. This may benefit the user in many different ways. For example, with many federally regulated data types, the data may legally be required to be stored on U.S. soil. Accordingly, the group locality functionality introduced by the mechanisms of the illustrated embodiments may prevent a user from accidentally storing the objects on clustered storage outside of the allowed area.

In still another embodiment, certain consistency checking functionality may be implemented. For example, using the checking functionality, when a user attempts to perform operations that would modify an individual object, a warning can be issued indicating that the change can potentially affect the logical consistency of the clustered objects. In a further example, if the object is the source of objects that are being deduplicated, the duplicated data source can be shifted so as not to affect other duplicates.

Certain aspects of the mechanisms of the illustrated embodiments may assist in other storage enhancement functionality, such as the use of the aforementioned data deduplication. For example, by leveraging the understanding of the parent-child relationships stored within the system, the mechanisms of the illustrated embodiments can take duplicate information (as is the very nature of parent-child relationships) and recognize the duplicate information as indeed being duplicated. From there, the data can be stored once and internal-links to the data can replace the duplicates, all unbeknownst to the user.

Finally, various search methodologies may be optimized using the relationships within the meta data between files, in lieu of a bottom-up disk searching approach as is typical with current search methods. By using just the relationships between objects, according to various aspects of the illustrated embodiments, traditional search methods in object-based storage may be eliminated altogether.

Turning now to the Figures, and first to FIG. 1, exemplary architecture 10 of a computing system environment is depicted. Architecture 10 may, in one embodiment, be implemented at least as part of a system for effecting mechanisms of the present invention. The computer system 10 includes at least one central processing unit (CPU) 12, which is connected to communication port 18 and memory device 16. The communication port 18 is in communication with a communication network 20. The communication network 20 may be configured to be in communication with systems 22, 24 and architecture 10, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere, and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12. As one of ordinary skill in the art will appreciate, a number of systems 10 may be configured in a connected and/or distributed way, physically located together or across a long geographically connected network, for example.

Figure 2:
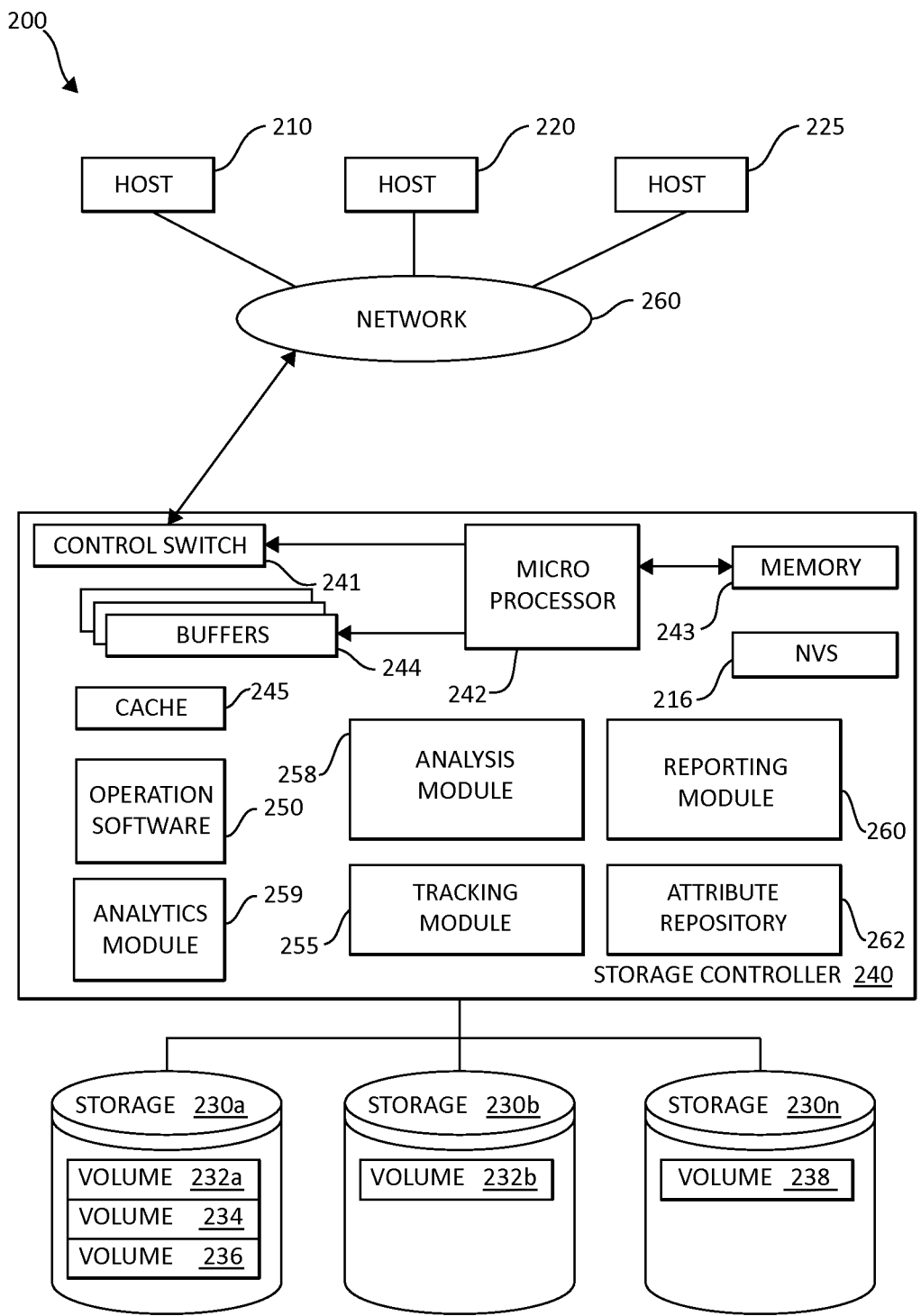
FIG. 2 is an exemplary block diagram showing a hardware structure of a data storage system in a computing storage environment, again in which aspects of the present invention may be realized.

FIG. 2 is an exemplary block diagram showing a hardware structure of a data storage system 200 that may be used in the overall context of performing functionality according to various aspects of the present invention. Data storage system may for example, in one embodiment, implement an enhanced object-based storage architecture as will be further described.

Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. Data storage system 200 may implement other functionality, such as that found in IBM® ProtecTIER® deduplication system TS7650G™, although one of ordinary skill in the art will recognize that a variety of deduplication, encryption, data processing, etc. hardware and software, separately or in combination, may be utilized to implement the functionality according to aspects of the illustrated embodiments.

Network connection 260 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes found in a distributed computing environment.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a tracking module 255, an analysis module 258, a reporting module 260 and one or more attribute repositories 262. The tracking module 255, analysis module 258, reporting module 260 and repositories 262 may operate in conjunction with each and every component of the storage controller 240, the hosts 210, 220, 225, and storage devices 230. The tracking module 255, analysis module 258, reporting module 260 and attribute repositories 262 may be structurally one complete module or may be associated and/or included with other individual modules. The tracking module 255, analysis module 258, reporting module 260 and attribute repositories 262 may also be located in the cache 245 or other components, as one of ordinary skill in the art will appreciate.

The tracking module 255, analysis module 258, reporting module 260 and attribute repositories 262 may individually and/or collectively perform various aspects of the present invention as will be further described. For example, the tracking module 255 may perform relationship/attribute tracking operations and related analytics in accordance with aspects of the illustrated embodiments. The analysis module 258 may also use analytics to identify, organize, create, delete or perform other actions on various attribute relationships between objects. Reporting module 260 may notify various portions of the data storage system 200 about changes in identified relationships, warn users about placement of data, and so forth. Finally, each of the various attribute relationships of the objects in the storage system, including identification of the objects themselves and other attributes, may be stored, organized, retrieved, and deleted in the attribute repositories 262. As one of ordinary skill in the art will appreciate, the tracking module 255, analysis module 258, reporting module 260 and attribute repository 262 may make up only a subset of various functional and/or functionally responsible entities in the data storage system 200.

Other ancillary hardware may be associated with the storage system 200. For example, as shown, the storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the tracking module, analysis module 258, reporting module 260, attribute repositories 262, or other blocks of functionality, in which information may be set. Multiple buffers 244 may be implemented with the present invention to assist with the operations as described herein.

Figure 3:
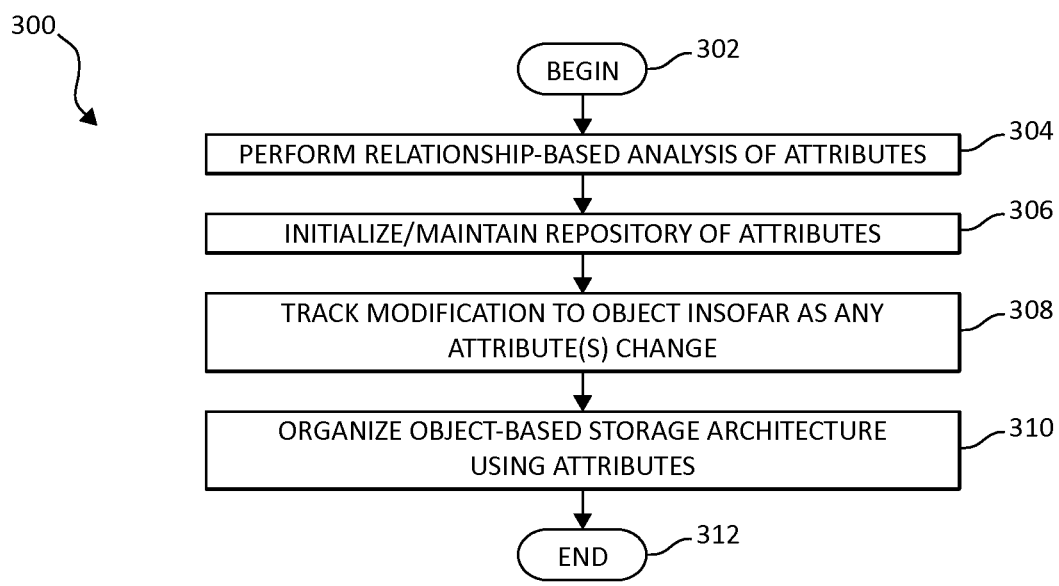
FIG. 3 is a flow chart diagram illustrating an exemplary method for management of object-based storage by a processor, in accordance with various aspects of the present invention.

Turning now to FIG. 3, a flow chart diagram, illustrating an exemplary method 300 for enhancement of object-based storage using a processor, among other aspects of the illustrated embodiments, is depicted. Method 300 begins (step 302). As a first step, a relationship-based analysis of various attributes of certain objects (in one embodiment, each object) in the storage environment is undertaken (step 304). In this step, the identifying information of the objects themselves, parent/child relationship attributes, flat relationship attributes, and consistency-based relationship attributes may be identified, associated with the object(s), organized into groups, and so forth.

Step 306, following, initializes, maintains, and tracks (in real-time, for example), the attributes. At a subsequent time, if any of the attributes change, those modifications are tracked by the system and identified (step 308). Based on this regime, the object-based storage architecture is organized with the assistance of the attribute relationships (step 310). The method then ends (step 308).

Figure 4A:
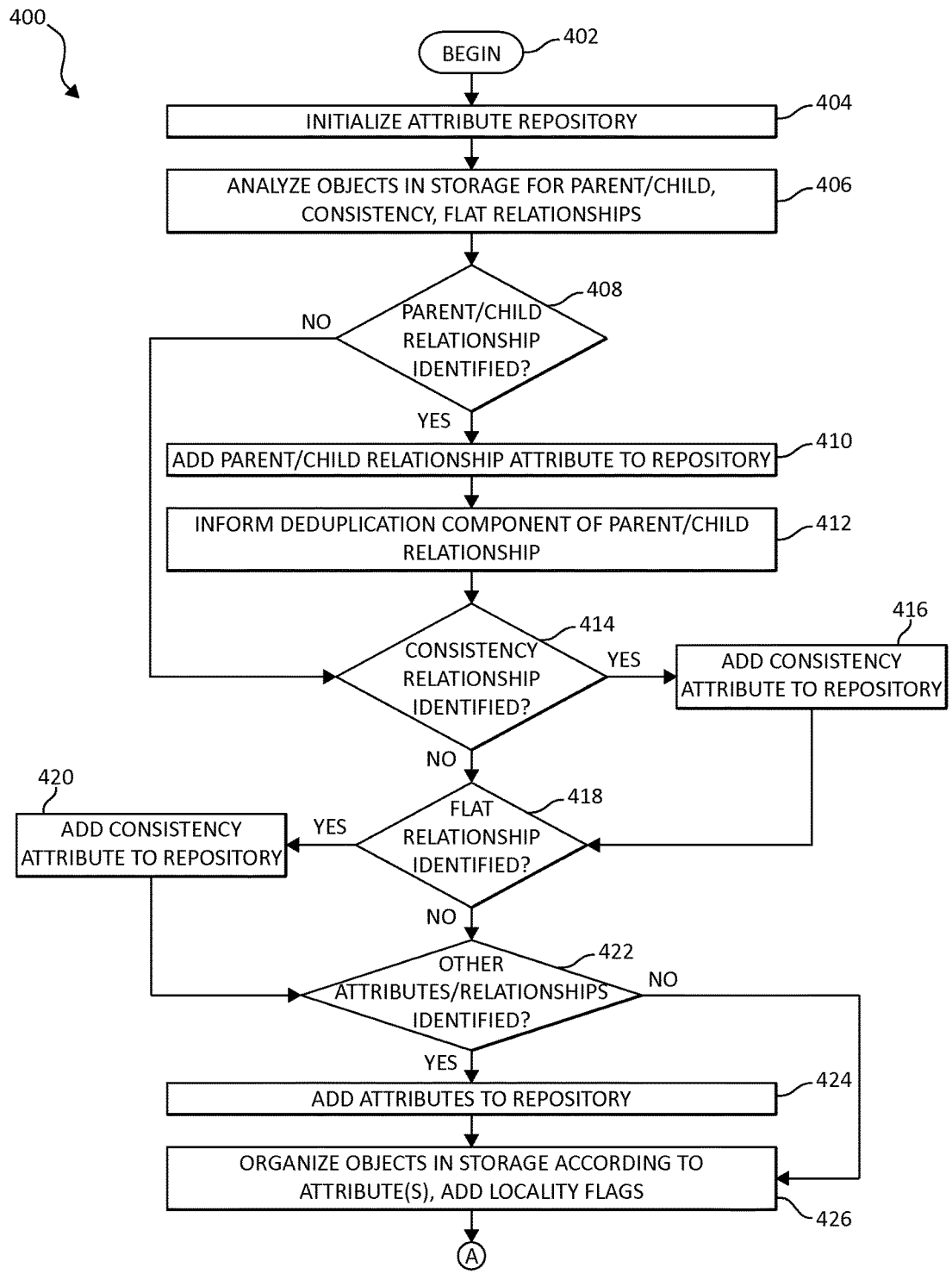
FIG. 4A is an additional flow chart diagram illustrating an additional exemplary method for management of object-based storage is provided, again in which aspects of the present invention may be implemented.
Figure 4B:
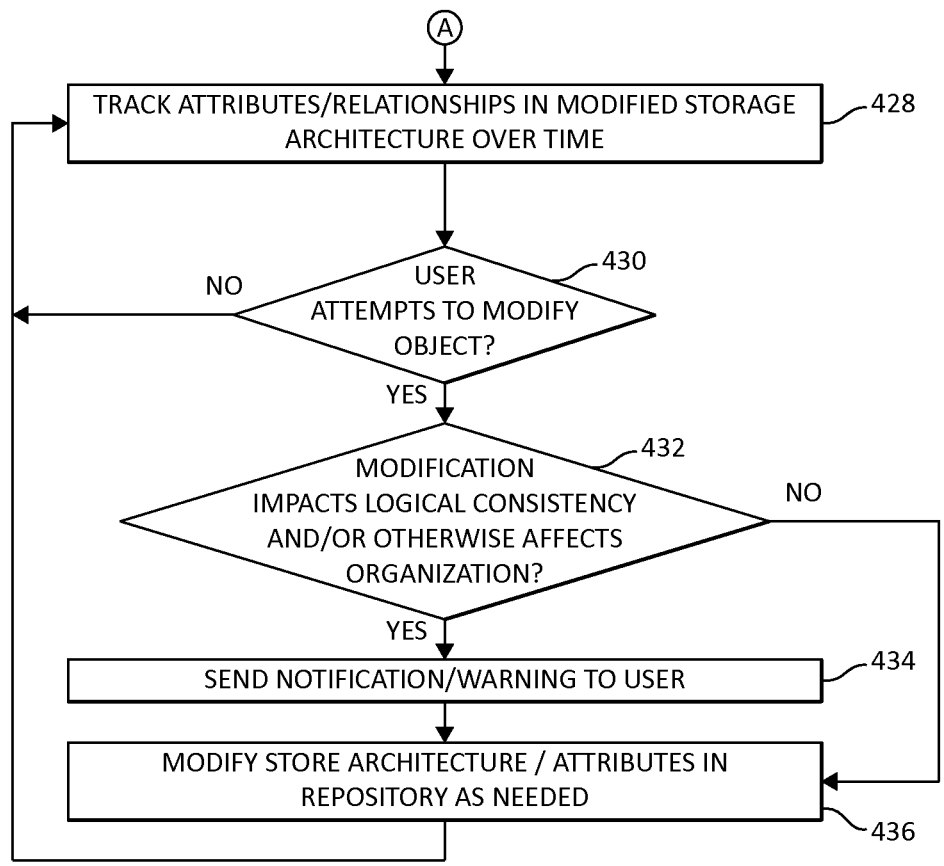
FIG. 4B is a continuation of the flow chart diagram first illustrated in FIG. 4A.

Various aspects of the generalized steps in FIG. 3, previously, are further detailed, along with other inventive aspects of the mechanisms of the illustrated embodiments, in FIGS. 4A and 4B, following, which illustrates an additional method 400 for enhancement of object-based storage according to the present invention.

Method 400 begins (step 402) with the initialization of the attribute repository (step 404) as previously described. Each object in the storage is then analyzed for attribute relationships, such as parent/child, consistency, and flat relationships as previously described (step 406). Continuing to decision step 408, if a parent/child relationship is identified, the relationship is added as an attribute to the repository (step 410), and the deduplication component of the storage system is notified of the specific parent/child relationship (step 412) to assist in deduplication functionality.

Returning to step 408, if a parent/child relationship is not identified, the method moves to decision step 414, which queries of a consistency relationship is identified. If so, the specific consistency attribute is added to the repository (step 416) in similar fashion to the parent/child relationship previously in step 410.

If in step 414, a consistency relationship is not identified, the method 400 moves to decision step 418, which queries if a flat relationship is identified. If so, the consistency attribute is added to the repository in step 420. If no, the method 400 moves to decision step 422, which queries whether other attributes/relationships are identified. If so, those attributes/relationships are also similarly added to the repository (step 424).

In step 426, following, each of the objects in storage are organized accordingly to their attendant attributes/relationships. In addition, various locality flags are added to the objects to identify their organization in the storage according to a specific location.

Continuing now to FIG. 4B, once each of the objects has been analyzed, and their attendant attributes/relationships have been identified and organized, the attributes are then tracked over time in the modified storage (step 428). As previously mentioned, this tracking functionality may occur in real-time in the storage system as various components are operational.

In decision step 430, if at a subsequent time, a user attempts to modify a particular object, the method 400 continues to decision step 432, which queries whether the instant modification impacts logical consistency of the object and/or otherwise affects the object's organization (locality relationships, attributes in relationship to other objects, and so forth). If this is the case, the method 400 provides a notification and/or warning to the user (e.g., the data the user is attempting to modify is being moved to a physical location that is not permitted, etc.)

In either case, returning to step 432, the storage architecture and/or attributes (e.g., the organization of the attributes as per the specific object) is modified per the user as necessary, and the method 400 returns to step 428 to again track the status of the various objects in the storage over time.

Figure 5:
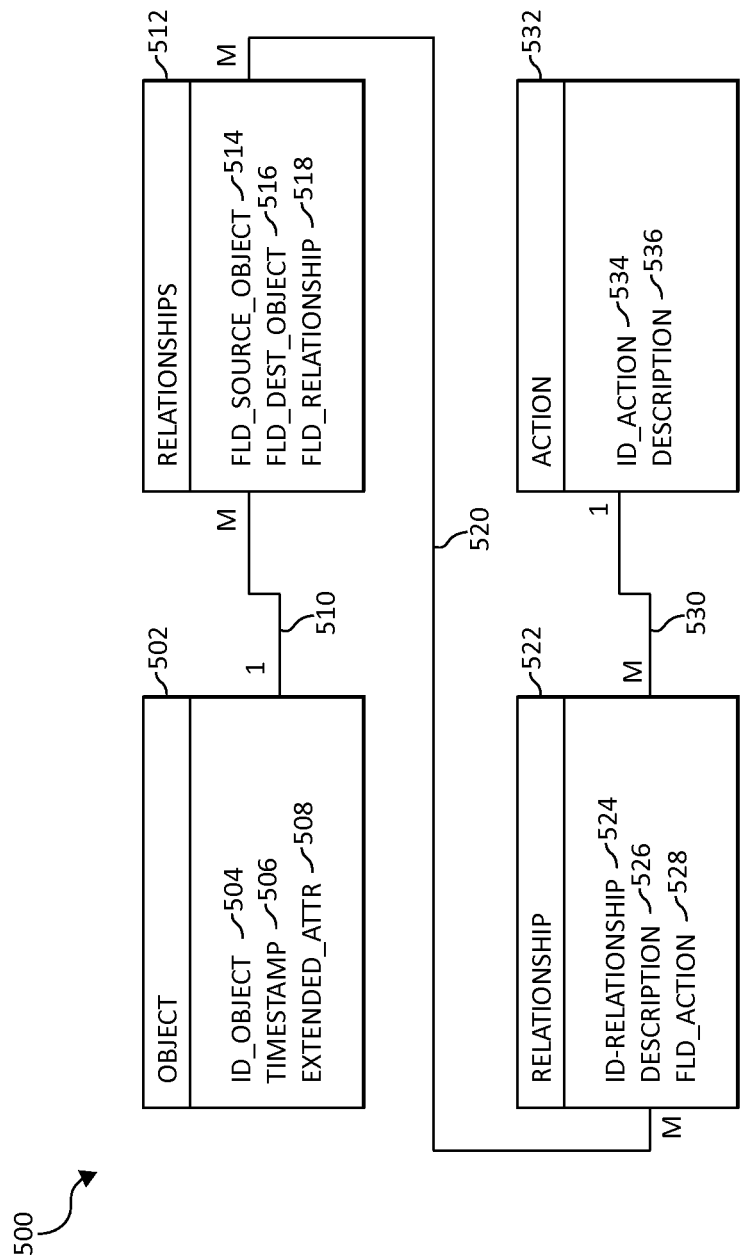
FIG. 5 is a block diagram illustrating exemplary functionality for storing various object information, including object identification information, relationship/attribute information, and associated descriptions.

FIG. 5, following, is a block diagram illustrating various functionality 500 representative of storing of object relationships and descriptions in an exemplary embodiment. In an illustrative way, FIG. 5 depicts figuratively certain mechanisms for initialization, organization, creation, deletion, and other operations that a particular storage system may undertake to perform the object-based storage enhancement according to the present invention. As shown, a single object 502 is representative with attendant information such as the object's identification (504), timestamp (506) and extended attribute(s) 508.

Designation 510 illustrates the 1 to many associations with the object 502 and various relationships 512 as shown. These relationships 512 may include a locality flag designating the source object (514), a locality flag designating the destination object (516), and a locality flag designating a specific relationship (518) (note, there may be many relationships found in relationships 512).

In similar fashion to 510, designation 520 shows the many to many relationships between the relationships 512 and a specific relationship 522. Relationship 522 may include identification information of the relationship itself (524), a description of the particular relationship 526, and a locality flag designating an action associated with the particular relationship (528).

Again, in similar fashion to 510, designation 530 shows a many to one relationship between the specific relationship 522 and a particular action 532 associated with the relationship 522. The action 532 may include identification information of the action (534), and a description of the action (536). Examples of the action 532 that may be found in the description 536 may include a read, write, move, delete, and so forth. One of ordinary skill in the art will appreciate, however, that the various associations depicted in FIG. 5 may vary according to a specific object, relationship, action, storage architecture, data structure, and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for management of object-based storage by a processor, comprising:

performing a relationship-based analysis of attributes of an object in the object-based storage storing an entirety of data contained therein in a flat disk space and unstructured format; wherein the object comprises a data object associated with a unique identifier and having object metadata;

maintaining a repository of the attributes;

tracking a modification to the object insofar as any of the attributes change, wherein performing the relationship-based analysis and tracking the modification to the object includes analyzing the object for each of a parent/child relationship, a consistency group and a flat relationship, wherein an attribute arising from the parent/child relationship, consistency group and flat relationship is maintained in the repository and tracked for changes over time;

organizing an object-based storage architecture of the object-based storage for the object using the attributes notwithstanding the object-based storage architecture continues to implement storing the entirety of the data contained therein in the flat disk space and unstructured format; wherein the object-based storage architecture is organized using the attributes to implement at least one of a plurality of data operations unable to otherwise be implemented prior to the organization; and wherein one of the plurality of data operations comprises a data deduplication operation utilizing the repository to track the unique identifier associated with the data object such that the object-based storage architecture is organized according to the attributes to perform the data deduplication operation of the data object with an additional data object in the storage in lieu of utilizing block-based deduplication techniques; and defining a cluster of objects, and enabling a locality flag associated with a geographic location for the object to be associated with the cluster, wherein the object comprises a regulated data type subject to restriction within the geographic location such that if the object associated with the cluster is attempted to be moved outside a predetermined zone associated with the geographic location, a warning notification is sent to a user.

2. The method of claim 1, further including, pursuant to organizing the object-based storage architecture for the object using the attributes, performing at least one of:
    integrating a grouping notification, and
    clustering the object in the object-based storage architecture.

3. The method of claim 1, further including, if a modification to the object associated with the cluster is determined to affect a logical consistency of the object or other objects in the cluster, sending the warning notification to the user.

4. The method of claim 1, further including upon a determination of the parent/child relationship of the object:
    recognizing the object as potentially being a duplicate of another object, and
    informing a deduplication system component of the object-based storage architecture of the potential duplicate.

5. The method of claim 1, further including performing a search in the object-based storage architecture for the object using the attributes.

6. A system for management of object-based storage, comprising:
    a processor, operational in the object-based storage, wherein the processor:
        performs a relationship-based analysis of attributes of an object in the object-based storage storing an entirety of data contained therein in a flat disk space and unstructured format;
        wherein the object comprises a data object associated with a unique identifier and having object metadata, maintains a repository of the attributes,
        tracks a modification to the object insofar as any of the attributes change, wherein performing the relationship-based analysis and tracking the modification to the object includes analyzing the object for each of a parent/child relationship, a consistency group and a flat relationship, wherein an attribute arising from the parent/child relationship, consistency group and flat relationship is maintained in the repository and tracked for changes over time,
        organizes an object-based storage architecture of the object-based storage for the object using the attributes notwithstanding the object-based storage architecture continues to implement storing the entirety of the data contained therein in the flat disk space and unstructured format; wherein the object-based storage architecture is organized using the attributes to implement at least one of a plurality of data operations unable to otherwise be implemented prior to the organization; and wherein one of the plurality of data operations comprises a data deduplication operation utilizing the repository to track the unique identifier associated with the data object such that the object-based storage architecture is organized according to the attributes to perform the data deduplication operation of the data object with an additional data object in the storage in lieu of utilizing block-based deduplication techniques, and
        defines a cluster of objects, and enabling a locality flag associated with a geographic location for the object to be associated with the cluster, wherein the object comprises a regulated data type subject to restriction within the geographic location such that if the object associated with the cluster is attempted to be moved outside a predetermined zone associated with the geographic location, a warning notification is sent to a user.

7. The system of claim 6, wherein the processor, pursuant to organizing the object-based storage architecture for the object using the attributes, at least one of:
    integrates a grouping notification, and
    clusters the object in the object-based storage architecture.

8. The system of claim 6, wherein the processor, if a modification to the object associated with the cluster is determined to affect a logical consistency of the object or other objects in the cluster, sends the warning notification to the user.

9. The system of claim 6, wherein the processor, upon a determination of the parent/child relationship of the object:
    recognizes the object as potentially being a duplicate of another object, and
    informs a deduplication system component of the object-based storage architecture of the potential duplicate.

10. The system of claim 6, wherein the processor performs a search in the object-based storage architecture for the object using the attributes.

11. A computer program product for management of object-based storage by a processor,
    the computer program product comprising a non-transitory computer-readable storage medium having computer-readable program code portions stored therein, the computer-readable program code portions comprising:
        a first executable portion that performs a relationship-based analysis of attributes of an object in the object-based storage storing an entirety of data contained therein in a flat disk space and unstructured format; wherein the object comprises a data object associated with a unique identifier and having object metadata;
        a second executable portion that maintains a repository of the attributes;
        a third executable portion that tracks a modification to the object insofar as any of the attributes change, wherein performing the relationship-based analysis and tracking the modification to the object includes analyzing the object for each of a parent/child relationship, a consistency group and a flat relationship, wherein an attribute arising from the parent/child relationship, consistency group and flat relationship is maintained in the repository and tracked for changes over time;
        a fourth executable portion that organizes an object-based storage architecture of the object-based storage for the object using the attributes notwithstanding the object-based storage architecture continues to implement storing the entirety of the data contained therein in the flat disk space and unstructured format; wherein the object-based storage architecture is organized using the attributes to implement at least one of a plurality of data operations unable to otherwise be implemented prior to the organization; and wherein one of the plurality of data operations comprises a data deduplication operation utilizing the repository to track the unique identifier associated with the data object such that the object-based storage architecture is organized according to the attributes to perform the data deduplication operation of the data object with an additional data object in the storage in lieu of utilizing block-based deduplication techniques; and a fifth executable portion that defines a cluster of objects, and enabling a locality flag associated with a geographic location for the object to be associated with the cluster, wherein the object comprises a regulated data type subject to restriction within the geographic location such that if the object associated with the cluster is attempted to be moved outside a predetermined zone associated with the geographic location, a warning notification is sent to a user.

12. The computer program product of claim 11, further including a sixth executable portion that, pursuant to organizing the object-based storage architecture for the object using the attributes, at least one of:

integrates a grouping notification, and clusters the object in the object-based storage architecture.

13. The computer program product of claim 11, further including a sixth executable portion that, if a modification to the object associated with the cluster is determined to affect a logical consistency of the object or other objects in the cluster, sends the warning notification to the user.

14. The computer program product of claim 11, further including a sixth executable portion that, upon a determination of the parent/child relationship of the object:

recognizes the object as potentially being a duplicate of another object, and informs a deduplication system component of the object-based storage architecture of the potential duplicate.

15. The computer program product of claim 11, further including a sixth executable portion that performs a search in the object-based storage architecture for the object using the attributes.

* * * * *